United States Patent Office 3,796,697
Patented Mar. 12, 1974

3,796,697
PENTAPEPTIDE
George Rogelio Flouret, Waukegan, Ill., assignor to Abbott Laboratories, North Chicago, Ill.
No Drawing. Filed Nov. 2, 1971, Ser. No. 199,392
Int. Cl. C07c *103/52*
U.S. Cl. 260—112.5      9 Claims

ABSTRACT OF THE DISCLOSURE

The synthesis of the pentapeptide

Gly—Leu—Arg—Pro—Gly—amide carrying easily removable protective groups on the $N^\alpha$ of glycine and on the Arg moiety is described; the correspondingly protected tetrapeptide is used as the starting material. The new pentapeptide, upon removal of the protective group on the amino group of the glycine moiety is an important intermediate for the preparation of the gonadotropin-releasing hormone.

DETAILED DESCRIPTION OF THE INVENTION

Recent discovery of the aminoacid sequence of the gonadotropin (Gn)-releasing hormone (RH) has made it highly desirable to produce this substance on a practical scale in a purity sufficient to use the substance therapeutically in instances of hormone deficiencies and possibly as a regulating agent for the ovulation cycle in female warm-blooded animals. For instance, it has been found that small doses of Gn—RH, administered by intravenous injections to female sheep in the anestrus cycle, produces ovulation. The formula of the Gn—RH has been identified with the aminoacid sequence pyroGlu—His—Trp—Ser—Tyr—
                            Gly—Leu—Arg—Pro—Gly—NH₂ but in order to make such a large molecule from simple, single aminoacids, a considerable number of steps including several condensation reactions are required. In order to assure such condensations to take place at the desired sites, other active sites or functional groups on the molecule might be conveniently protected by some groups that can be removed at will.

A relatively simple method has now been devised to produce the desired aminoacid chain in surprisingly good yields. The new method involves a minimum of group-protecting and removal reactions for such protective groups and employs a number of new intermediates which are important stepping stones for making Gn—RH and other peptides.

For the purpose of the present disclosure, it is to be understood that all aminoacids used herein are in their optically active L-form except for glycine.

The present invention is particularly concerned with the pentapeptide which is one of the precursors for making Gn—RH and carries protective groups on the active sites of the glycine and arginine moieties that can be removed by simple methods to make the unprotected pentapeptide or, if desired, after further peptide chain extension. It is another object of the present invention to provide a process for the preparation of a protected pentapeptide that may be used for chain extension to the correspondingly protected decapeptide which is a direct precursor to Gn—RH. It is a further object of this invention to provide a poly-protected pentapeptide that can be used as an intermediate without adding further protective groups to make the correspondingly protected Gn—RH.

These and other objects are accomplished by providing

Y—Gly—Leu—($N^\omega$—R)Arg—Pro—Gly—NH₂    (I)

wherein R is a protective group that is easily removable without affecting the bonds in the aminoacid chain and Y is hydrogen or a protective group that can be removed from the intact peptide chain without affecting R. Ordinarily, R is nitro, tosyl, tert.butoxycarbonyl (hereinafter simply referred to as BOC), p-nitrobenzyloxycarbonyl or tetrachloroisopropyloxyphthalyl which is used to substitute one of the hydrogen atoms in the amino group of the guanidine moiety in Arg; Y is hydrogen, BOC, o-nitrophenylsulfenyl, 2-(p-diphenyl)-isopropyloxycarbonyl, benzyloxycarbonyl or phthalyl.

The protected pentapeptide of Formula I is prepared by reacting the $N^\alpha$-protected tetrapeptide Leu($N^\omega$—R″)Arg—Pro—Gly—NH₂ with the p-nitrophenyl ester (NPE) of

Y—NH—CH₂—COOH wherein Y is BOC, benzoxycarbonyl, p-nitro or p-methoxybenzyloxycarbonyl, 2-(p-diphenyl)-isopropyloxycarbonyl, o-nitrophenylsulfenyl, phthalyl or trifluoroacetyl in an inert solvent. The named protective group Y can be removed by simple conventional methods to produce the pentapeptide carrying only protective group R. This protect pentapeptide (Formula I; Y is hydrogen) can be converted to the similarly protected decapeptide by reacting it first with BOC—(O—Bzl)tyrosine NPE, removing the BOC group, condensing the resulting di-protected hexapeptide with BOC—(O—Bzl)serine NPE, removing the BOC group, condensing the resulting heptapeptide with BOC-tryptophane NPE, removing the BOC group, subsequently condensing the obtained octapeptide with $N^{Im}$-protected (or unprotected) histidine carrying a $N^\alpha$-protective group and after removing the latter, the formed triprotected nonapeptide is reacted with pyroglutamic acid pentachlorophenyl ester. The free decapeptide (or Gn—RH) can be obtained from that condensation product by treating it with hydrogen fluoride. During this reaction, the OH-protecting groups on the tyrosine and serine moieties, the optional protective group in histidine and the protective groups in the $N^\omega$-position of arginine and $N^\alpha$ of pyroglutamyl are all removed and replaced by hydrogen. Alternately, some commonly used protective groups can be removed by hydrogenation using a palladium catalyst.

In a more specific embodiment, the above-named protected tetrapeptide wherein R is NO₂ is dissolved in dimethylformamide at a concentration of between 0.1 and 1.0 molarity and a 0–50% excess over molarity of BOC-glycine NPE or a similarly N-protected ester of glycine is added at a temperature between 0 and 30° C. After several hours, the reaction solution is evaporated and the residue dissolved in 15% methanol/chloroform and the solution is placed on a silica gel column. The column is eluted with chloroform containing increasing amounts of methanol until the desired pentapeptide appears in the eluate. The desired fractions of eluate are then combined.

In order to prepare Gn—RH from the above material, the protective group Y is removed from the Gly moiety by any of the suitable methods known in the peptide art and the ensuing pentapeptide is condensed with BOC—(O—Bzl)Tyr NPE; the resulting diprotected hexapeptide is condensed first with BOC—(O—Bzl)Ser NPE and then in sequence with the other animoacids as shown above with or without further protective groups. The resulting poly-protected decapeptide is then dissolved in an inert solvent and placed in a HF-resistant reaction vessel and treated there at a temperature between 0° and 30° C. with excess hydrogen fluoride. The excess hydrogen fluoride is removed after about one hour, the solvent is removed and the product is dried and purified. The Gn—RH prepared in this manner is highly active in biological tests showing luteinizing hormone-releasing activity in warm-blooded animals.

In order to make the tetrapeptide used as the starting material for the present invention, the following reaction sequence is carried out: N-benzyloxycarbonyl-proline NPE is reacted with glycinamide, preferably with an excess of the latter over the equimolar amount, and the obtained N-benzyloxycarbonylprolylglycinamide is converted to the unprotected dipeptide by hydrogenation or acid treatment. The prolylglycinamide is then reacted with $N^\alpha$-benzyloxycarbonyl-$N^\omega$-nitroarginine to form a twice-protected tripeptide from which the benzyloxycarbonyl group is removed by acid treatment to furnish $N^\omega$-nitroarginyl-prolylglycinamide, hereinafter referred to as $(N^\omega$—$NO_2)$Arg—Pro—Gly—$NH_2$ The latter is reacted with N—BOC-leucine NPE to produce a twice-protected tetrapeptide from which the BOC group is removed by treatment with an acid to yield Leu—$(N^\omega$—$NO_2)$Arg—Pro—Gly—$NH_2$ The above mentioned condensation reactions are all carried out in the presence of an inert solvent such as dimethylacetamide or dimethylformamide or other organic liquids that do not react with either of the starting materials or the product of each step. Of course, it is to be understood that the above reaction sequence for making and using the new pentapeptide may be followed without using the specific protective group named in the described stages. For instance, the nitro group protecting the amino group in the guanidine moiety of arginine may be replaced by converting the amino group to an amide or half-amide with a sulfonic or a carboxylic acid, e.g., tosyl, benzyloxycarbonyl or tetrachloroisopropyloxyphthalyl. In all instances, the protective groups employed in making up the aminoacid sequence of Gn—RH, of course, should be chosen in such a way that they can easily be removed by one or more simple treatments which are mild enough as not to affect the peptide chain bonds. This is the case with all above mentioned protective groups and also include the p-nitro-, p-methyl and p-methoxy substituted derivatives of the above listed groups containing a benzyl moiety.

If desired, the two protective groups of the compound of Formula I may be removed stepwise; for instance, the ordinarily used Y-groups may be removed by well-known methods simultaneously removing the R-group on Arg or Y and R may be removed by methods known to replace them by hydrogen without affecting the bonds between the individual aminoacids. However, in removing Y first, the ensuing pentapeptide carrying only a protective group in the Arg moiety is of considerable value since it permits the series of condensation reactions described above without interference through the basicity of the guanidine group.

In order to show the preparation of the new pentapeptide, reference is made to the following examples which are to be understood as illustrations only and are not to be construed to limit the invention in any respect.

Example 1

A solution of 5.83 g. of

Leu—$(N^\omega$—$NO_2)$Arg—Pro—Gly—$NH_2$ in 12 ml. of dimethylformamide is treated with 4.62 g. of BOC-glycine NPE. The resulting solution is worked up after 16 hours of standing at room temperature by evaporating the dimethylformamide in vacuo and placing the residual oil representing crude, di-protected pentapeptide in 5% methanol in chloroform on 150 g. of silica gel. The column is first eluted with 5% methanol in chloroform and then the desired compound is eluted with 15% methanol in chloroform. Evaporation of the methanol/chloroform solution afforded 6.04 g. (78% of theory) of Example 2

A solution of 1.928 g. of the

N—BOC—Gly—Leu—$(N^\omega$—$NO_2)$
Arg—Pro—Gly—$NH_2$ which has an undefined melting point. The NMR spectrum is consistent with the structure and the elemental analysis is correct. The $R_f$ in 15% methanol in chloroform is 0.2 and $[\alpha]_D^{24}$ −29.9° (c. 1; dimethylformamide).

BOC—Gly—Leu—$(N^\omega$—$NO_2)$
Arg—Pro—Gly—$NH_2$ of Example 1 in 20 ml. of trifluoroacetic acid/methylene chloride 1:1 is allowed to stand for 15 minutes at room temperature. The solution is evaporated leaving a foam to which methylene chloride is added again followed by evaporation and this step is repeated 5 times. The resulting dry foam is dissolved in methanol and treated with an ion exchange resin (in the OH-cycle). The suspension is filtered and the resin is washed with methanol/acetic acid 9:1. The combined filtrate and wash liquor is evaporated to a dry powder which had an undefined melting point. The NMR spectrum and the elemental analysis confirm the expected aminoacid sequence:

Gly—Leu—$(N^\omega$—$NO_2)$Arg—Pro—Gly—$NH_2$ and the compound shows $R_f$ 0.1 in 15% methanol in chloroform (single spot). A yield of above 95% of theory is obtained.

To further characterize this material, the above compound was condensed with BOC—(O—Bzl)tyrosine NPE in a procedure similar to that described in Example 1 and the BOC-group was removed as described above. Further condensations and BOC-removal reactions carried out in sequence with BOC—(O—Bzl)Ser NPE and BOC-tryptophane NPE produced the tri-protected (on Arg, Tyr and Ser) o ctapeptide Trp—Ser—Tyr—Gly—Leu—Arg—Pro—Gly—$HN_2$ This reaction sequence was then repeated with BOC-histidine. The formed tri-protected nonapeptide was then condensed with pyroglutamic acid pentachlorophenyl ester in dimethylformamide to the corresponding decapeptide. The condensation product was isolated from the reaction solution by evaporation, dissolution in methanol/chloroform and purification by chromatography, using chloroform with increasing amounts of methanol as the eluate. The obtained decapeptide (Formula I wherein R is $NNO_2$ and Y is pyroGlu—His—Hrp—(O—Bzl)Ser—(O—Bzy)Tyr)

was then treated with excess hydrogen fluoride using anisole as the scavenger. Work-up of the reaction mixture by known methods furnished the compound of Formula I wherein Y is pyroGlu—His—Trp—Ser—Tyr and R is hydrogen. This product was found to be identical with a sample of natural Gn—RH.

By replacing the BOC—Gly NPE used above with other N-protected glycine p-nitrophenyl esters, the following pentapeptides are obtained in the same manner.

N-benzyloxycarbonyl-X
N-p-nitrobenzyloxycarbonyl-X
N-p-methoxybenzyloxycarbonyl-X
N-2-(p-diphenyl)isopropyloxycarbonyl-X
N-o-nitrophenylsulfenyl-X
N-phthalyl-X
N-trifluoroacetyl-X wherein X represents the aminoacid chain

Gly—Leu—(N^ω—R)Arg—Pro—Gly—NH₂

In all instances, the N^ω of arginine may carry the nitro group as in Example 1 or the tosyl group, benzyloxycarbonyl or similar protective groups in place of the above used nitro group. In each case, the reaction described above proceeds in the same fashion and all of the listed compounds may be converted to polyprotected Gn—RH by the series of condensation reactions and deprotecting steps described above. By proper selection of the protectice groups on Ser, Tyr, Arg (and optionally on His), all of them may be removed simultaneously with hydrogen fluoride to yield Gn—RH making these pentapeptides all equally useful precursors therefor.

Of course, the synthesis for the protected tetrapeptide starting materials described above has to be modified when making the pentapeptides carrying a different protective group on the N-arginyl moiety. However, using other protected arginine in the shown sequence does not alter the synthesis described in the present invention in a significant manner. The individual amino-acids carrying the above-shown protective groups including the O-protected tyrosine are known in the art and are often used in peptide syntheses; they are described in the English Edition of the textbook by Schröder et al., entitled The Peptides I (Academic Press 1965) on pages 167–174 for arginine and the chapter on pages 3–51 concerning blocking or masking groups or in Peptides, Proceedings of the 9th Edition Peptide Symposium, edited by Beyerman (North-Hollant Publishing Co., Amsterdam 1967) page 50 ff. for arginine.

I claim:

1. The pentapeptide

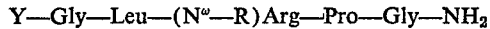
Y—Gly—Leu—(N^ω—R)Arg—Pro—Gly—NH₂ wherein Y is hydrogen, benzoxycarbonyl, p-nitrobenzoxycarbonyl, p-methoxybenzoxycarbonyl, 2-(p-diphenyl)isopropyloxycarbonyl, o-nitrophenylsulfenyl, phthalyl, trifluoroacetyl or tertbutyloxycarbonyl and R is hydrogen nitro, tosyl, tert.-butoxycarbonyl, p-nitrobenzyloxycarbonyl or tetrachloroisopropyloxyphthalyl.

2. The pentapeptide of claim 1 where Y is hydrogen.
3. The pentapeptide of claim 1 where Y is tert.-butyloxycarbonyl.
4. The pentapeptide of claim 1 wherein Y is tert.-butyloxycarbonyl or hydrogen and R is NO₂.
5. The process of preparing the pentapeptide

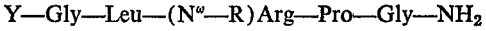
Y—Gly—Leu—(N^ω—R)Arg—Pro—Gly—NH₂ wherein Y is an easily removable protective group attached to the nitrogen atom of Gly and R is a protective group which can be removed by a chemical treatment which does not affect the peptide chain, comprising treating the tetrapeptide

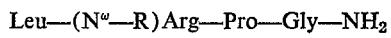
Leu—(N^ω—R)Arg—Pro—Gly—NH₂ with an excess of a compound of the formula

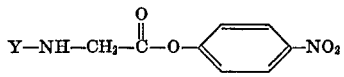

$$Y-NH-CH_2-\overset{O}{\underset{\|}{C}}-O-\!\!\left\langle\!\!\bigcirc\!\!\right\rangle\!\!-NO_2$$

wherein R and Y are defined as above, in the presence of an inert, polar, organic solvent at a temperature between 0° and 30° C. for a period of at least one hour and isolating the resulting pentapeptide from the reaction mixture.

6. The process of claim 5 wherein R is NO₂.
7. The process of claim 5 wherein Y is tert.-butyloxycarbonyl and R is nitro.
8. The process of claim 5 wherein said inert, polar solvent is dimethylformamide.
9. The pentapeptide of claim 1 wherein R is tosyl.

References Cited

UNITED STATES PATENTS 3,328,382   6/1967   Boissonnas et al. __ 260—112.5

ELBERT L. ROBERTS, Primary Examiner

U.S. Cl. X.R.

424—177